US012360243B2

(12) United States Patent
Lee et al.

(10) Patent No.: US 12,360,243 B2
(45) Date of Patent: Jul. 15, 2025

(54) DISTANCE MEASURING DEVICE AND METHOD FOR MEASURING DISTANCE BY USING THE SAME

(71) Applicant: SAMSUNG ELECTRONICS CO., LTD., Suwon-si (KR)

(72) Inventors: Jisan Lee, Seoul (KR); Inoh Hwang, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1156 days.

(21) Appl. No.: 17/204,369

(22) Filed: Mar. 17, 2021

(65) Prior Publication Data
US 2022/0113414 A1   Apr. 14, 2022

(30) Foreign Application Priority Data

Oct. 14, 2020 (KR) ........................ 10-2020-0132982

(51) Int. Cl.
*G01S 17/32* (2020.01)
*G01S 7/481* (2006.01)
*G01S 17/894* (2020.01)

(52) U.S. Cl.
CPC ............ *G01S 17/32* (2013.01); *G01S 7/4817* (2013.01); *G01S 17/894* (2020.01)

(58) Field of Classification Search
CPC ...... G01S 17/32; G01S 7/4817; G01S 17/894; G01S 7/354; G01S 7/4021; G01S 7/4865;
(Continued)

(56) References Cited

U.S. PATENT DOCUMENTS 5,298,905 A   3/1994  Dahl
7,649,490 B2  1/2010  Park et al.
(Continued)

FOREIGN PATENT DOCUMENTS

KR        10-0809353 B1    3/2008
KR    10-2014-0081131 A    7/2014
(Continued)

OTHER PUBLICATIONS

Hasse et al., "Measurement concept to reduce environmental impact in direct time-of-flight LiDAR sensors," Proceedings of SPIE, vol. 11288, Quantum Sensing and Nano Electronics and Photonics XVII, 1128809, Jan. 31, 2020, Total 10 pages.
(Continued)

*Primary Examiner* — Isam A Alsomiri
*Assistant Examiner* — Sanjida Naser
(74) *Attorney, Agent, or Firm* — Sughrue Mion, PLLC

(57) ABSTRACT

A distance measuring device and a method of operating the same are provided. The distance measuring device may include a transmitter configured to emit a sensing signal toward a target object based on a transmission signal; a receiver configured to detect the sensing signal and output a reception signal corresponding to the sensing signal; and a processor configured to correct the reception signal using a baseline having a peak value that varies according to a time index, and determine a distance to the target object based on a cross-correlation signal indicating a cross-correlation between the corrected reception signal and the transmission signal.

18 Claims, 11 Drawing Sheets

(58) Field of Classification Search
CPC .......... G01S 7/487; G01S 13/89; G01S 17/89;
G01S 7/497; G01S 17/10; G01S 7/4802;
G01S 17/08
See application file for complete search history.

(56) References Cited

U.S. PATENT DOCUMENTS

| | | | |
|---|---|---|---|
| 2005/0200833 | A1 | 9/2005 | Nakamura et al. |
| 2016/0299219 | A1 | 10/2016 | Suzuki et al. |
| 2017/0076513 | A1* | 3/2017 | Nordbruch .......... B60W 50/082 |
| 2017/0168147 | A1 | 6/2017 | Choi et al. |
| 2019/0235052 | A1 | 8/2019 | LaChapelle et al. |
| 2019/0271767 | A1* | 9/2019 | Keilaf .................. G01S 17/931 |
| 2019/0293770 | A1* | 9/2019 | Subasingha .......... G01S 7/4865 |
| 2021/0055392 | A1 | 2/2021 | Lee et al. |
| 2021/0149053 | A1 | 5/2021 | Lee |
| 2021/0199808 | A1 | 7/2021 | Shin et al. |

FOREIGN PATENT DOCUMENTS

| | | | |
|---|---|---|---|
| KR | 20140114131 A | * | 9/2014 |
| KR | 10-2017-0069332 A | | 6/2017 |
| KR | 10-1881418 B1 | | 7/2018 |

OTHER PUBLICATIONS

Bijelic et al., "A Benchmark for Lidar Sensors in Fog: Is Detection Breaking Down?," 2018 IEEE Intelligent Vehicles Symposium (IV), Jun. 26-30, 2018, pp. 760-767. Total 8 pages.

Heinzler et al., "Weather Influence and Classification with Automotive Lidar Sensors," 2019 IEEE Intelligent Vehicles Symposium (IV), Jun. 9-12, 2019, pp. 1527-1534, Total 8 pages.

Judd et al., "Automotive sensing: assessing the impact of fog on LWIR, MWIR, SWIR, visible, and lidar performance," Proceedings of SPIE, vol. 11002, Infrared Technology and Applications XLV, 110021F, May 7, 2019, Total 14 pages.

Communication dated Aug. 19, 2021 issued by the European Intellectual Property Office in counterpart European Application No. 21165882.8.

Wassim G. Najm, "Comparison of alternative crash avoidance sensor technologies", Proceedings of SPIE, vol. 2344, 1994, 11 pages total, XP060033365.

Sheraz Khan et al., "Modeling Laser Intensities For Simultaneous Localization and Mapping", IEEE Robotics and Automation Letters, vol. 1, No. 2, Jul. 1, 2016, 8 pages total, XP011602390.

* cited by examiner

DISTANCE MEASURING DEVICE AND METHOD FOR MEASURING DISTANCE BY USING THE SAME

CROSS-REFERENCE TO RELATED APPLICATION

This application is based on and claims priority under 35 U.S.C. § 119 to Korean Patent Application No. 10-2020-0132982, filed on Oct. 14, 2020, in the Korean Intellectual Property Office, the disclosure of which is incorporated by reference herein in its entirety.

BACKGROUND

1. Field

Apparatuses and methods consistent with example embodiments to optically measuring a distance to a target object.

2. Description of Related Art

The distance measuring device can measure a distance to an object by measuring the time of flight (ToF) of light. Specifically, the distance measuring device may calculate the distance to the object by measuring the round trip time of light that is emitted from a light source of the distance measuring device and then is reflected by the object and returned to the distance measuring device, and may generate a depth image of the object based on the calculated distance.

This distance measuring device uses a method using a Time to Digital Converting (TDC) circuit. In the method using the TDC circuit, the time between the transmission signal of the transmitter and the reception signal of the receiver can be measured and converted into a distance. This method has the advantages of simple structure and excellent distance measurement resolution but has disadvantages of poor measurement accuracy and a short measurable distance when the signal-to-noise ratio of the reception signal is low.

SUMMARY

Example embodiments address at least the above problems and/or disadvantages and other disadvantages not described above. Also, the example embodiments are not required to overcome the disadvantages described above, and may not overcome any of the problems described above.

One or more example embodiments provide a distance measuring device capable of correcting depth distortion caused by a surrounding environment and an operating method thereof.

According to an aspect of an example embodiment, there is provided a distance measuring device including: a transmitter configured to emit a sensing signal toward a target object based on a transmission signal; a receiver configured to detect the sensing signal and output a reception signal corresponding to the sensing signal; and a processor configured to correct the reception signal using a baseline having a peak value that varies according to a time index, and determine a distance to the target object based on a cross-correlation signal indicating a cross-correlation between the corrected reception signal and the transmission signal.

The receiver may be further configured to output, as the reception signal, a first reception signal corresponding to the sensing signal reflected from the target object and a second reception signal corresponding to the sensing signal reflected by a surrounding object that is different from the target object.

The processor may be further configured to correct the first reception signal and the second reception signal based on the baseline so that a size of the corrected first reception signal is greater than a size of the corrected second reception signal.

The processor may be further configured to correct the reception signal by dividing the reception signal by the peak value of the baseline after matching a time index of the reception signal and the time index of the baseline.

The peak value of the baseline may be greater than or equal to a size of the reception signal at a point where the time index of the baseline matches a time index of the reception signal.

The peak value of the baseline may be inversely proportional to a value of the time index.

The baseline may be based on a result of receiving the sensing signal reflected from a reference object having a reflectance of 90% or more while changing a distance of the reference object.

The distance measuring device may be configured to measure the distance to the target object when the target object is 10 meter or more away from the distance measuring device.

The processor may be further configured to determine the distance between the distance measuring device and the target object by using a time that is taken until the cross-correlation signal becomes greater than or equal to a reference value.

The reference value may be a maximum value of the cross-correlation signal.

The receiver may include a converter configured to convert the reception signal into a digital signal.

The transmitter may be configured to modulate the sensing signal by at least one of phase modulation and frequency modulation and emit the modulated sensing signal.

The transmitter may be configured to emit the sensing signal as at least one of an optical signal and a radio frequency (RF) signal.

According to an aspect of another example embodiment, there is provided a distance measuring method including: emitting a sensing signal to a target object, as a transmission signal; detecting the sensing signal and outputting a reception signal corresponding to the sensing signal; correcting the reception signal using a baseline having a peak value that values according to a time index; and determining a distance to the target object based on a cross-correlation between the corrected reception signal and the transmission signal.

The outputting of the reception signal may include outputting, as the reception signal, a first reception signal corresponding to the sensing signal reflected from the target object and a second reception signal corresponding to the sensing signal reflected by a surrounding object that is different from the target object.

The correcting of the reception signal may include correcting the first reception signal and the second reception signal based on the baseline so that a size of the corrected first reception signal is greater than a size of the corrected second reception signal.

The correcting of the reception signal may include correcting the reception signal by dividing the reception signal by the peak value of the baseline after matching a time index of the reception signal and the time index of the baseline.

The peak value of the baseline may be greater than or equal to a size of the reception signal at a point where the time index of the baseline matches a time index of the reception signal.

The peak value of the baseline may be inversely proportional to the time index.

The baseline may be generated based on a result of receiving the sensing signal reflected from a reference object having a reflectance of 90% or more while changing a distance of the reference object.

According to an aspect of an example embodiment, there is provided a distance measuring device including: a transmitter configured to emit a first part of a transmission signal to a target object, as a sensing signal; a receiver configured to detect the sensing signal that is reflected from the target object and output a reception signal corresponding to the detect sensing signal; a memory configured to store baseline data that indicates a relation between a peak value of a reference signal that is reflected from a reference object, and a time index representing a time of flight (ToF) of the reference signal, and a processor configured to retrieve the baseline data from the memory, correct the reception signal based on the baseline data, and determine a distance to the target object based on a cross-correlation between the corrected reception signal and a second part of the transmission signal.

BRIEF DESCRIPTION OF THE DRAWINGS

The above and/or other aspects will be more apparent by describing certain example embodiments, with reference to the accompanying drawings, in which.

DETAILED DESCRIPTION

Figure 1:
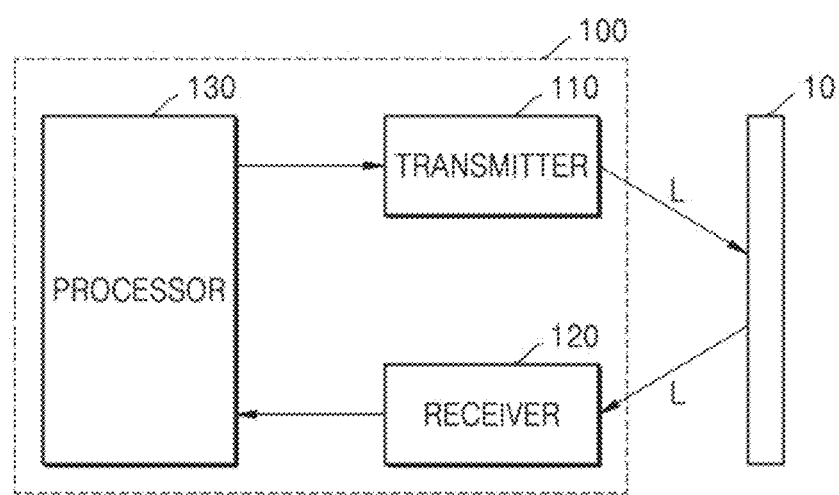
FIG. 1 is a diagram illustrating an example operation of a distance measuring device according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

As for terms used in the present embodiments, general terms that are currently widely used as possible are selected while considering functions in the present embodiments, but this may vary depending on the intentions or precedents of those skilled in the art, and the emergence of new technologies. In addition, in certain cases, there are terms arbitrarily selected by the applicant, and in this case, the meaning of the terms will be described in detail in the description of the corresponding embodiment. Therefore, the terms used in the present embodiments should be defined based on the meaning of the term and the overall contents of the present embodiments, not a simple name of the term.

In the descriptions of the embodiments, when one part is connected to another part, this includes not only the case of being directly connected, but also the case of being electrically connected with other components interposed therebetween. The terms of a singular form may include plural forms unless otherwise specified. In addition, when a certain part "includes" a certain component, it means that other components may be further included rather than excluding other components unless otherwise stated.

Terms such as "consisting" or "comprising" used in the present embodiments should not be construed as necessarily including all of the various elements or various steps described in the specification, and some of the elements or some steps may not be included, or it should be interpreted that additional elements or steps may be further included.

The description of the following embodiments should not be construed as limiting the scope of the rights, and what those skilled in the art can easily infer should be construed as belonging to the scope of the embodiments. Hereinafter, embodiments for illustration only will be described in detail with reference to the accompanying drawings.

FIG. 1 is a diagram illustrating an exemplary operation of a distance measuring device according to an embodiment.

A distance measuring device 100 may be used as a sensor that acquires three-dimensional (3D) information such as distance information on a target object 10 in real time. For example, the distance measuring device 100 may include a light detection and ranging (LiDAR) sensor, a radar, and the like, but is not limited thereto. The distance measuring device 100 may be applied to an unmanned vehicle, an autonomous vehicle, a robot, and a drone.

Referring to FIG. 1, the distance measuring device 100 may include a transmitter (e.g., a transmitter circuit) 110 that emits a sensing signal L toward the target object 10 in response to a transmission signal that is an electrical signal, a receiver (e.g., a receiver circuit) 120 that detects the sensing signal L and outputs a reception signal as an electrical signal, and a processor 130 that measures the distance to the target object 10 by controlling the transmitter 110 and the receiver 120. The sensing signal L may be an optical signal, and the receiver 120 may convert the detected optical signal into the electrical signal.

The transmitter 110 may output a sensing signal L to be used for analysis of the location and shape of the target object 10. The transmitter 110 may output an optical signal as the sensing signal L, but is not limited thereto. The transmitter 110 may also output a radio frequency (RF) signal.

For example, the transmitter 110 may output light having a wavelength in an infrared band. When the infrared band light is used, it can be prevented from being mixed with natural light in the visible region including sunlight. However, it is not necessarily limited to the infrared band and may emit light of various wavelength bands.

The transmitter 110 may include at least one light source. For example, the transmitter 110 may include a light source such as a laser diode (LD), an edge emitting laser, a vertical-cavity surface emitting laser (VCSEL), a distributed feedback laser, a light emitting diode (LED), a super luminescent diode (SLD), and the like.

The transmitter 110 may generate and output light of a plurality of different wavelength bands. In addition, the transmitter 110 may generate and output pulsed light or continuous light.

According to an embodiment, the transmitter 110 may further include a beam steering element for changing an irradiation angle of light. For example, as the beam steering element, a scanning mirror or an optical phased array may be used.

According to an embodiment, the transmitter 110 may emit a sensing signal whose frequency or phase is modulated over time. For example, the transmitter 110 may emit a sensing signal using a frequency modulated continuous wave (FMCW) method or a phase modulation continuous wave (PMCW) method.

The receiver 120 includes at least one light detection element, and the light detection element may detect a sensing signal L reflected from the target object 10 by classifying the sensing signal L. According to the embodiment, the receiver 120 may further include an optical element for collecting the reception signal to a predetermined light detection element.

The light detection element is a sensor capable of sensing light, and may be, for example, a light-receiving element that generates an electric signal by light energy. For example, the light detector may include an Avalanche Photo Diode (APD) or a Single Photon Avalanche Diode (SPAD). The kind of light-receiving element is not specifically limited.

The transmitter 110 and the receiver 120 may be implemented as separate devices, or may be implemented as one device, such as a transceiver. For example, when the distance measuring device 100 is a radar device, the radar sensor may emit a radar signal, which is a sensing signal, to the outside and receive a radar signal reflected from the target object 10. The radar sensor described above may be the transmitter 110 and the receiver 120.

The processor 130 may control the transmitter 110 and the receiver 120 to control the overall operation of the distance measuring device 100. For example, the processor 130 may perform power supply control, on/off control, pulse wave (PW) or continuous wave (CW) generation control, and the like for the transmitter 110.

The processor 130 may perform signal processing for obtaining information on the target object 10 by using the reception signal outputted from the receiver 120. The processor 130 may determine the distance to the target object 10 based on the flight time of the sensing signal outputted from the transmitter 110 and perform data processing for analyzing the location and shape of the target object 10. For example, the processor 130 may generate a point cloud based on information on distance to the target object 10 and obtain a 3D image of the target object 10 based on the point cloud.

The 3D image acquired by the processor 130 may be transmitted to another unit and used. For example, such information may be transmitted to the processor 130 of an autonomous driving device such as an unmanned vehicle or a drone in which the distance measuring device 100 is employed. In addition, such information may be utilized in smartphones, mobile phones, personal digital assistants (PDAs), laptops, personal computers (PCs), wearable devices, and other mobile or non-mobile computing devices.

Meanwhile, the distance measuring device 100 of the present disclosure may further include other general-purpose components in addition to the components of FIG. 1.

For example, the distance measuring device 100 may further include a memory for storing various types of data. The memory may store data processed by the distance measuring device 100 and data to be processed. In addition, the memory may store applications, drivers, and the like to be driven by the distance measuring device.

The memory includes random access memory (RAM) such as dynamic random access memory (DRAM), static random access memory (SRAM), and the like, read-only memory (ROM), electrically erasable programmable read-only memory (EEPROM), CD-ROM, Blu-ray, or other optical disc storage, a hard disk drive (HDD), solid state drive (SSD), or flash memory, and furthermore, may include other external storage devices that can access the distance measuring device 100.

The distance measuring device 100 may be implemented as a housing or a plurality of housings. When the distance measuring device 100 is implemented with a plurality of housings, the plurality of components may be connected by wire or wirelessly. For example, the distance measuring device 100 may be divided into a first device including the transmitter 110 and the receiver 120 and a second device including the processor 130. The distance measuring device 100 may be implemented as a part of a device that performs other functions, for example, an autonomous driving device.

Figure 2A:
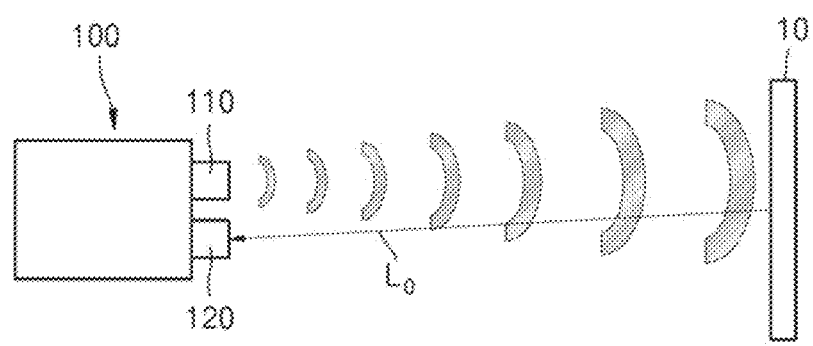
FIG. 2A is a diagram illustrating an example in which a distance measuring device operates in an ideal environment.
Figure 2B:
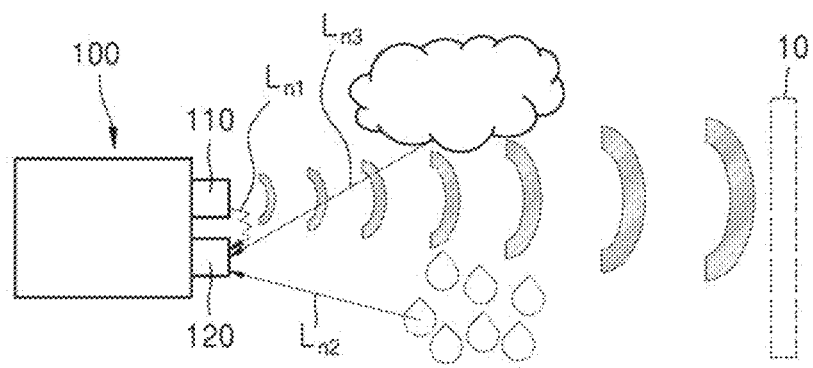
FIG. 2B is a diagram illustrating an example of an operation of a distance measuring device in a noisy environment.

FIG. 2A is a view showing an example of operating the distance measuring device 100 in an ideal environment, and FIG. 2B is a diagram illustrating an example of an operation of the distance measuring device 100 in a noisy environment.

As shown in FIG. 2A, in an ideal environment, the sensing signal emitted from the transmitter 110 may be reflected from the target object 10. The receiver 120 may detect a sensing signal reflected from the target object 10 and output a reception signal. The sensing signal Lo reflected from the target object 10 includes information on the object 10 and may be referred to as an object signal. When the receiver 120 detects only the sensing signal Lo reflected from the target object 10, the distance measuring device 100 may accurately measure information on the target object 10, for example, a distance to the target object 10. However, in the real world, the receiver 120 may further detect a sensing signal reflected from other surrounding objects other than the target object 10.

As shown in FIG. 2B, the transmitter 110 and the receiver 120 of the distance measuring device 100 may be physically at a close distance, and thus the sensing signal may be reflected or interfered by an optical lens or a module included in the transmitter 110. A part Ln1 of the sensing signal emitted from the transmitter 110 may propagate directly into the receiver 120. In addition, some Ln2 and Ln3 of the sensing signal emitted from the transmitter 110 may be reflected and scattered by other surrounding objects, such as fog or raindrops in the air and received by the receiver 120. Among the sensing signals, signals Ln1, Ln2, and Ln3 other than signals reflected from the target object 10 correspond to noise signals.

When the distance from the distance measuring device 100 to the target object 10 is close, since the intensity of the sensing signal Lo reflected on the target object 10 is dominant, the noise signals may not significantly affect the measurement accuracy. However, as the distance to the target object 10 increases, the intensity of the sensing signal Lo reflected from the target object 10 decreases, and the intensity of the sensing signal Ln1 directly received from the transmitter 110 to the receiver 120 or the sensing signals Ln2 and Ln3 reflected from fog or raindrops may be relatively large. Thus, the distance measuring device 100 may determine the distance using not only the object signal Lo, but also the noise signals Ln1, Ln2, and Ln3, which may cause distortion of the distance measurement. For example, when the target object 10 is far away, the distance measuring device 100 may erroneously detect a noise signal as an object signal.

The distance measuring device 100 according to an embodiment corrects or normalizes a reception signal using a baseline having a different peak value according to a time index, and determines a distance to the target object 10 using the corrected reception signal so that it is possible to prevent distortion of distance measurement.

Figure 3:
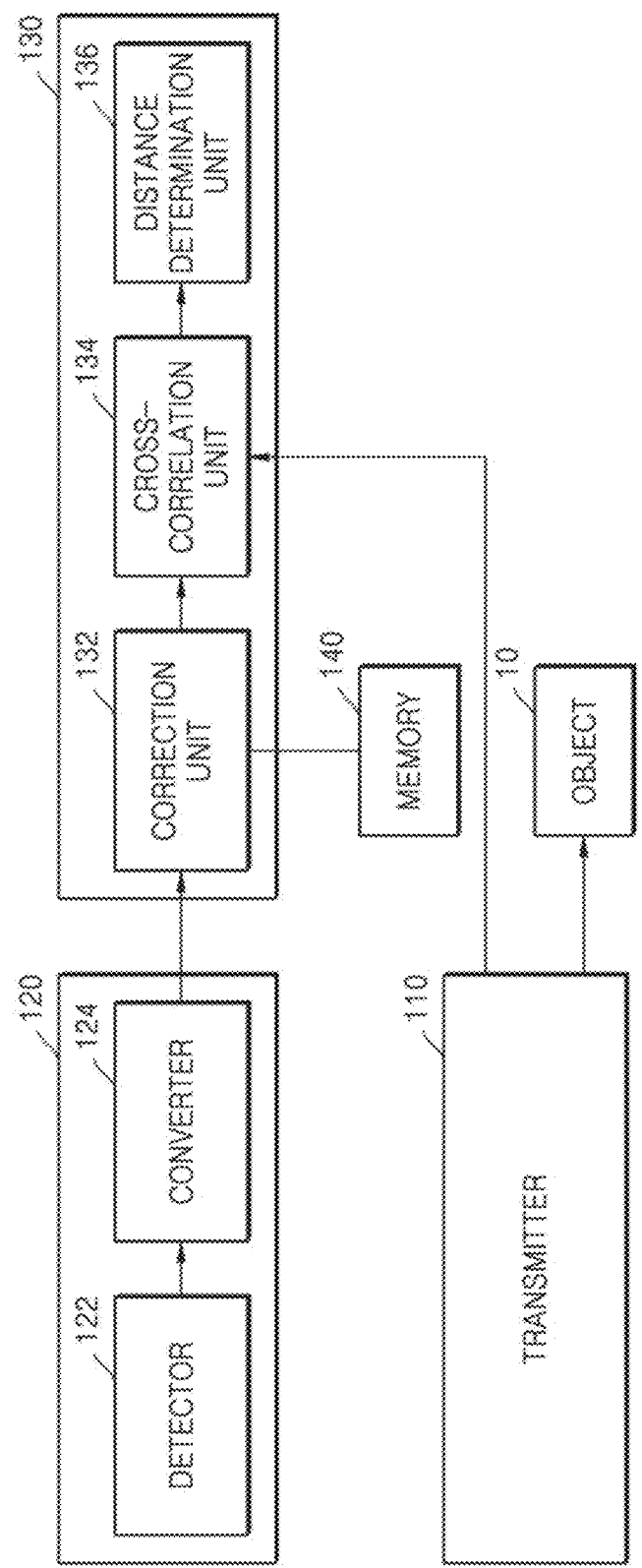
FIG. 3 is a block diagram showing in more detail a distance measuring device using a baseline according to an embodiment.
Figure 4:
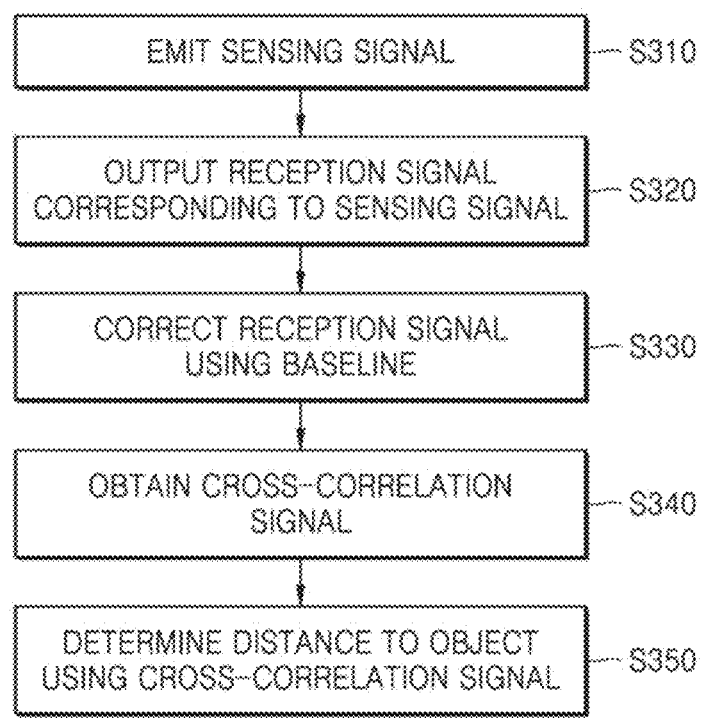
FIG. 4 is a flowchart illustrating a method of measuring a distance using a baseline according to an embodiment.

FIG. 3 is a block diagram showing in more detail a distance measuring device 100 using a baseline according to an embodiment, and FIG. 4 is a flowchart illustrating a method of measuring a distance using a baseline according to an embodiment. The term "baseline" may be also referred to as a baseline signal or baseline data.

Referring to FIGS. 3 and 4, the transmitter 110 may emit a sensing signal toward the target object 10 based on the transmission signal (operation S310). Specifically, the transmitter 110 may generate a transmission signal under the control of the processor 130 and may emit a first part of the transmission signal to the target object 10, as a sensing signal. In addition, a second part of the transmission signal of the transmitter 110 may be outputted to a cross-correlation unit 134. Some of the transmission signals can be used to calculate the flight time of the light. The transmitter 110 of FIG. 3 corresponds to the transmitter 110 of FIG. 1.

The receiver 120 may detect the sensing signal and output a reception signal corresponding to the sensing signal (operation S320). The above sensing signal may include a sensing signal reflected from the target object 10. However, the present embodiment is not limited thereto. The detected sensing signal may also include a sensing signal reflected from surrounding objects other than the target object 10. Thus, the reception signal outputted from the receiver 120 includes a reception signal corresponding to a sensing signal reflected from the target object 10 and a reception signal corresponding to a sensing signal reflected by surrounding objects other than the target object 10.

The receiver 120 may include a detector 122 that detects a sensing signal and outputs a reception signal, and a converter 124 that converts the reception signal into a digital signal. The detector may be an optical sensor or a radio frequency (RF) sensor. Since the detector has been described with reference to FIG. 1, the detailed description thereof will be omitted.

The converter 124 may convert the reception signal into a digital signal according to a preset sampling rate. For example, the sampling rate may be set in the range of about 100 Hz to about 10 GHz. The converter 124 may output the digital signal as vector data in the form of a column vector or a row vector. The vector data may mean an array in the form of a column vector or a row vector consisting of a set of elements. Each element may store a quantized value of the reception signal. The converter 124 may be an analog-to-digital converter (ADC) that converts an analog-type reception signal into a digital-type signal.

Alternatively, the transmitter 110 and the receiver 120 may include a high-pass filter that removes an offset from a transmission signal and a reception signal, and an amplifier (AMP) that amplifies the size of the transmission signal and the reception signal.

The transmitter 110 may further include an analog-to-digital converter for digitally converting a transmission signal.

The processor 130 determines the distance to the target object 10 using a reception signal and a transmission signal. Specifically, the processor 130 may include a correction unit 132 that retrieve a baseline from a memory 140, and correct the reception signal using the baseline, a cross-correlation unit 134 that generates a cross-correlation signal between the corrected reception signal and the transmission signal (e.g., the second part of the transmission signal), and a distance determination unit 136 for determining a distance from the cross-correlation signal to the target object 10.

The baseline is reference data with different peak values depending on the time index, and is data obtained from a sensing signal reflected from a reference object, for example, a reference object according to a distance of the target object 10 having high reflectivity in an ideal environment, for example, without pollution. The reference object used to obtain the baseline may have a reflectance of 90% or more, preferably 100%. For example, the reference object may be a white board.

While the baseline may vary depending on the type and performance of the transmitter 110, the receiver 120, and the converter 124 of the distance measuring device 100, the peak value of the baseline may decrease as a time index increases, that is, as the distance to the reference object increases. The time index may represent a TOF or may have a directly proportional relation to the TOF and the distance to the reference object.

Figure 5:
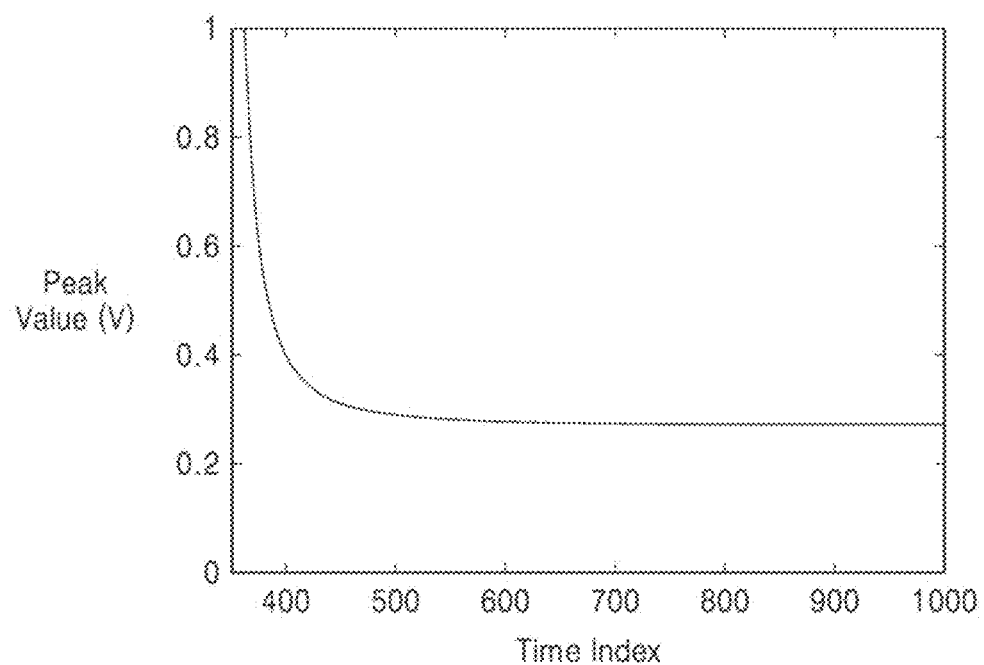
FIG. 5 is a diagram illustrating an example of a baseline according to an embodiment.

FIG. 5 is a diagram illustrating an example of a baseline according to an embodiment. As illustrated in FIG. 5, the peak value of the baseline may decrease as the time index value increases. The peak value may be represented as a voltage value. More specifically, the square of the time index value among the baselines is inversely proportional to the peak value, and the relational expression of the baseline is shown in Equation 1 below.

$$y = \frac{a}{x^2} + y_0 \qquad \text{[Equation 1]}$$

Here, x is a time index value, y is a peak value, and a and $y_o$ is a constant.

The correction unit 132 may correct the reception signal outputted from the receiver 120 using the baseline (operation S330). For example, the correction unit 132 may correct the reception signal by dividing the reception signal by the peak value of the baseline after matching the time index. In an ideal environment, the baseline obtained from the reference object may not include a noise signal. Since the baseline is a reception signal by a reference object having a high reflectivity, a reception signal obtained in the real world environment may be less than or equal to the corresponding peak value of the baseline.

Accordingly, when the correction unit 132 divides the reception signal by the peak value of the baseline, the object signal among the reception signals may be relatively large and the noise signal may be relatively small.

Figure 6:
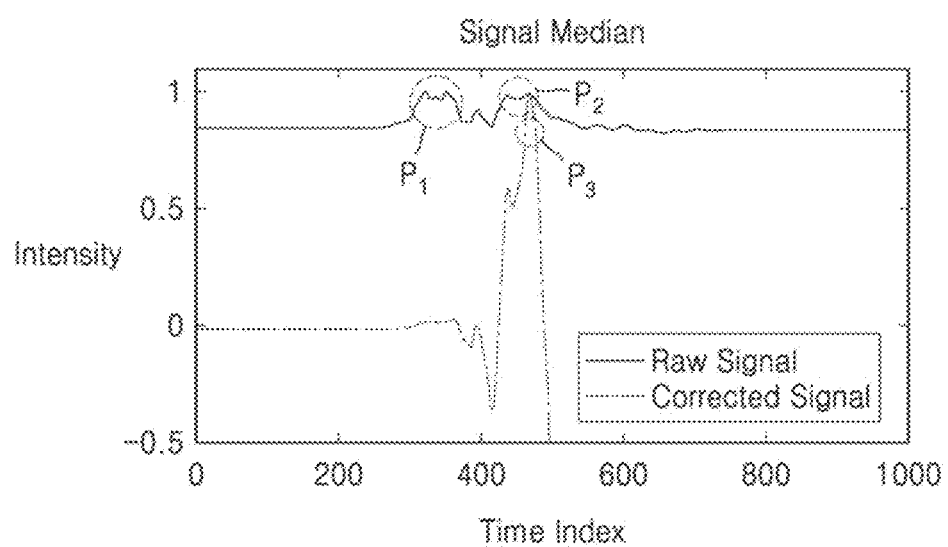
FIG. 6 is a graph showing a reception signal before correction and a reception signal after correction.

FIG. 6 is a graph showing a reception signal before correction and a reception signal after correction. As shown in FIG. 6, a reception signal outputted from the receiver 120 may have two peaks $P_1$ and $P_2$. One of the two peaks $P_1$ and $P_2$ may correspond to the sensing signal reflected from the target object 10, and the other one may correspond to a sensing signal reflected from a surrounding object (e.g., fog, internal material, and the like) other than the target object 10. When the reception signal includes two peaks $P_1$ and $P_2$, the processor 130 may generate an error in measuring the distance to the target object 10.

However, the reception signal corrected by the baseline may have one strong peak P3. Thus, it can be seen that in the corrected signal, the peak due to the noise signal disappears and the peak due to the object signal is more clarified.

The cross-correlation unit 134 may acquire a cross-correlation signal by using the transmission signal and the corrected reception signal (operation S340). For this, the cross-correlation unit 134 may include a correlator. In an embodiment, the cross-correlation unit 134 may generate a cross-correlation signal Rxy(t) according to Equation 2 below.

$$Rxy(t)=x(t)\otimes y(t)=\int_{-\infty}^{\infty}x(\tau)\cdot y(t+\tau)d\tau \quad \text{[Equation 2]}$$

In Equation 1, x(t) may represent a transmission signal, y(t) may represent a reception signal, and Rxy(t) may represent a cross-correlation signal.

When the transmission signal and the corrected reception signal outputted to the correction unit 132 are digitally converted signals, the cross-correlation unit 134 receives the quantized transmission signal $x_k$ and reception signal $y_{i+k}$, and the cross-correlation signal Rxyi between the transmission signal and the transmission signal is shown in Equation 3 below.

$$r_{xyi} = \sum_{k=0}^{N-1} x_k y_{i+k},\ i = -(N-1), -(N-2),\ \ldots, \quad \text{[Equation 3]}$$
$$-1, 0, 1, \ldots, (N-2), (N-1)$$

Alternatively, the cross-correlation unit 134 may calculate a cross-correlation signal between the reception signal and the transmission signal through Fast Fourier Transform. Fast Fourier transform can greatly reduce the number of calculations required for signal processing.

Since the cross-correlation signal is a result of quantitatively calculating the similarity between the corrected reception signal and the transmission signal, the transmission signal may have a shape most similar to the corrected reception signal when the transmission signal has a time delay equal to the time of flight (ToF) of the sensing signal. Thus, when a time corresponding to the ToF is delayed, the cross-correlation signal has a maximum value, and a time index value in which the cross-correlation signal has a maximum value may be the ToF of the sensing signal.

The distance determination unit 136 may determine the distance to the target object 10 by using a cross-correlation signal (operation S350). The distance determination unit 136 may determine a time until a time point at which the magnitude of the cross-correlation signal is equal to or greater than the reference value as the ToF of light. For example, the reference value may be a preset value or a maximum value of a cross-correlation signal. Further, the distance determination unit 136 may determine a distance to the target object 10 using the ToF.

For example, the distance determination unit 136 may calculate the ToF of the sensing signal using the sampling rate S of the converter 124 and the time index value $i_{max}$ at which the cross-correlation signal is the maximum. For example, the distance determination unit 136 may determine $2i_{max}/S$ as the ToF of the sensing signal, and the distance to the target object 10 may be $2ci_{max}/S$ (here, c is the speed of the sensing signal).

In another embodiment, when negative values are included in signal values representing a reception signal or a transmission signal due to noise or oscillation, an amplification effect by calculating a cross-correlation function may be reduced. The processor 130 may convert each of a reception signal and a transmission signal into a unipolar signal in order to prevent amplification effect due to calculation of a cross-correlation function from being reduced due to noise or oscillation. A unipolar signal is an opposite concept of a bipolar signal, and may mean a signal having only signal values of either polarity of either negative or positive.

The processor 130 may convert the reception signal into a unipolar transmission signal and a unipolar reception signal by taking absolute values of at least some of the transmitted and reception signals. Alternatively, the processor 130 may convert the reception signal and the transmission signal into a unipolar signal using a method other than a method of taking an absolute value. For example, the processor 130 may convert a reception signal and a transmission signal into a unipolar signal using a method of replacing all signal values having a value smaller than a specific value (a value greater than 0) among signal values representing a reception signal or a transmission signal with a specific value, and may convert a reception signal and a transmission signal into a unipolar signal using a method of squaring signal values representing received or transmission signals.

The processor 130 may correct the reception signal converted into a unipolar signal, calculate a cross-correlation signal between the corrected unipolar reception signal and the unipolar transmission signal, determine a time point at which a value of the calculated cross-correlation signal is equal to or greater than a reference value, for example, a time point at which the value of the cross-correlation function is maximum, and determine a time from the time point at which the transmission signal is detected to the time point at which the value of the cross-correlation function becomes maximum as the ToF of the sensing signal. The distance from the transmitter 110 to the target object 10 may be determined using the ToF and the sensing signal speed.

Further, according to another embodiment, the processor 130 may control the transmitter 110 to radiate the sensing signal toward the target object 10 multiple times when there is no time point at which the calculated cross-correlation signal value exceeds a preset threshold value, obtain a plurality of reception signals from the sensing signal reflected from the target object 10, and detect the ToF of the sensing signal by using the obtained reception signals. The processor 130 may increase the number of populations including reception signals through a plurality of measurements, and may perform noise cancellation by using a technique such as averaging. Accordingly, even in a noisy environment, the reception time point of the reflected laser pulse can be accurately detected.

As described above, when the reception signal is corrected using the baseline, the noise signal becomes smaller than the object signal, so that a cross-correlation signal may be determined by the object signal. Thus, the distance to the target object 10 can be obtained even by using a small object signal.

Figure 7:
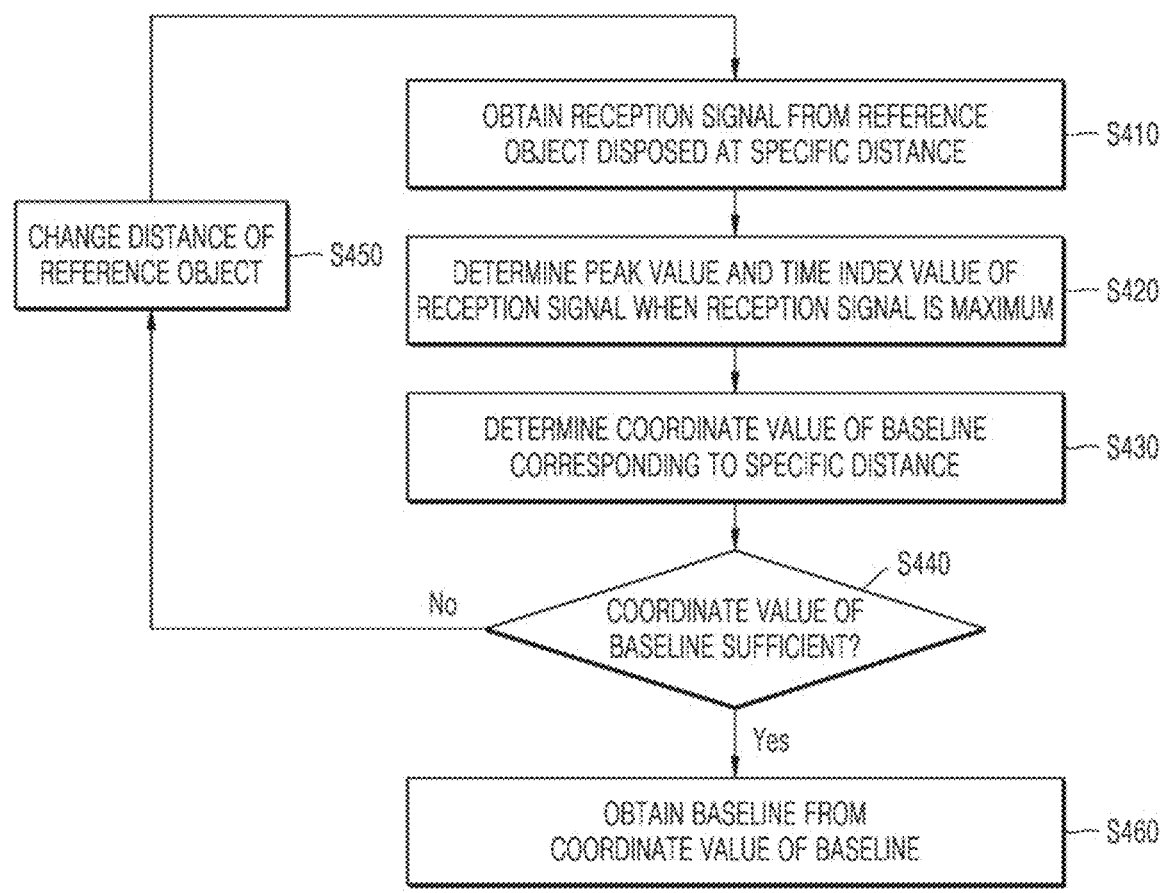
FIG. 7 is a flowchart illustrating a method of obtaining a baseline according to an embodiment.

FIG. 7 is a flowchart illustrating a method of obtaining a baseline according to an embodiment. The baseline is data obtained by detecting a sensing signal reflected from the reference object while changing the distance to the reference object at regular intervals.

The receiver 120 may obtain a reception signal from a reference object disposed at a specific distance (operation S410). The receiver 120 may output a reception signal corresponding to the sensing signal by detecting a sensing signal reflected from a reference object disposed at a specific distance. In an ideal environment, since there are no other surrounding objects that reflect off light emitted from a light source, except for the reference object, the sensing signal may be a signal reflected from the reference object, and the reception signal may be a signal including only information on the target object 10. The reception signal is digitally converted by the converter 124.

The processor 130 may determine a peak value and a time index value of the reception signal when the reception signal is the maximum (operation S420).

Figure 8:
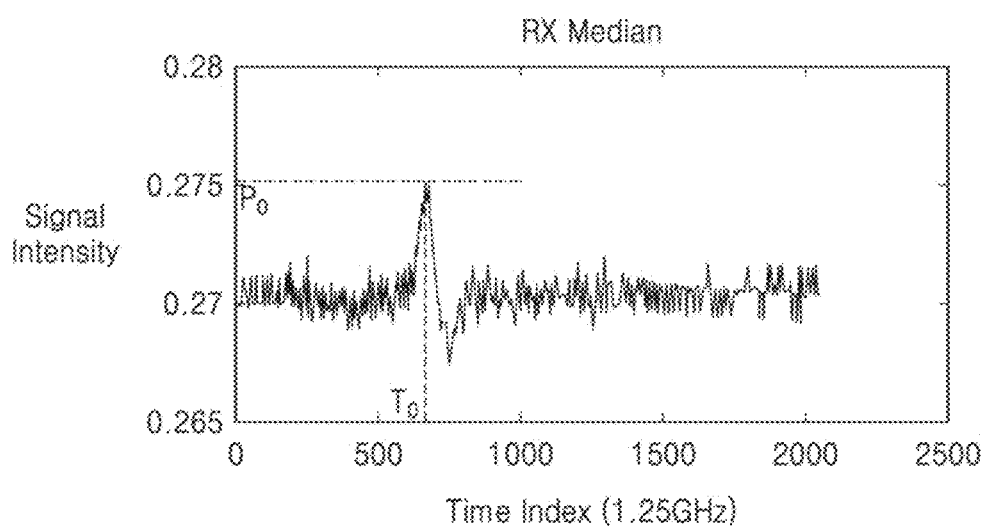
FIG. 8 is a diagram showing a signal size according to a time index.

FIG. 8 is a diagram showing a signal size according to a time index. As shown in FIG. 8, the processor 130 receives a reception signal from the receiver 120 according to a time index. The processor 130 determines a peak value and a time index value of the reception signal when the reception signal is the maximum.

Further, the processor 130 may determine the determined peak value and the time index value of the reception signal as the coordinate value of the baseline corresponding to the specific distance (operation S430).

The processor 130 determines whether the coordinate value of the baseline is sufficient (operation S440). When the number of determined coordinate values is greater than or equal to a predefined number or linear fitting is possible with coordinate values, the processor 130 determines that the coordinate values of the baseline are sufficient.

However, if it is determined that the coordinate value of the baseline is insufficient (operation S440—No), the distance of the reference object is changed, and the distance measuring device 100 may repeatedly perform operations S410 to S450.

If it is determined that the coordinate values of the baseline are sufficient (operation S440—Yes), the processor 130 obtains the baseline from the coordinate values of the baseline (operation S460). The processor 130 may obtain the baseline by linearly fitting the coordinate values of the baseline.

Figure 9:
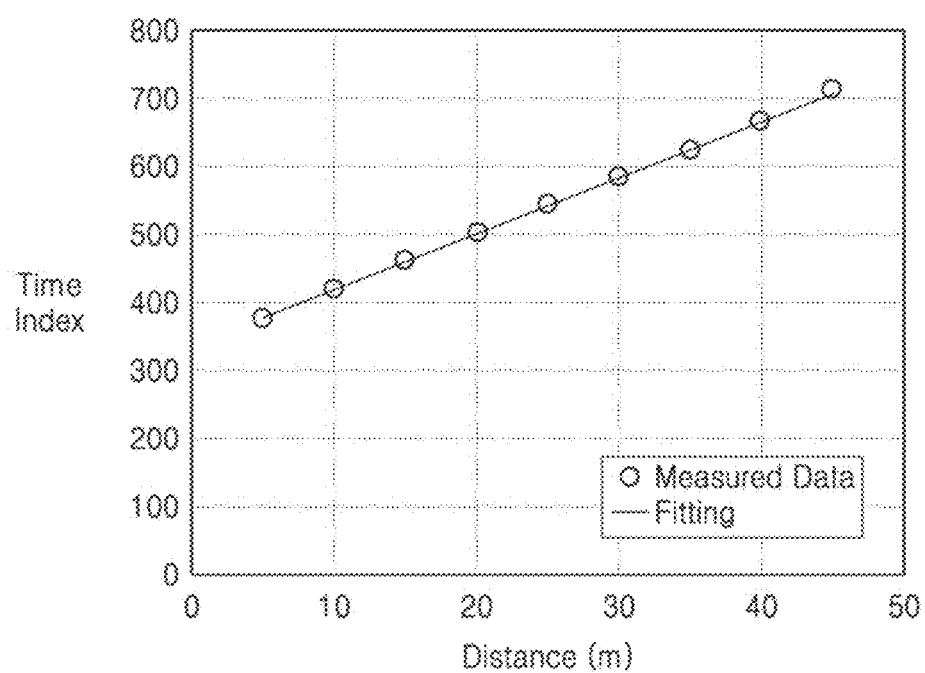
FIG. 9 is a graph showing a relationship between a distance to a reference object and a time index according to an embodiment.

FIG. 9 is a graph showing a relationship between a distance to a reference object and a time index according to an embodiment. The coordinate values of the baseline were acquired by changing the reference object at 5 meter (m) intervals. It can be seen that the time index value when the reception signal is at the maximum is proportional to the distance of the reference object.

Figure 10:
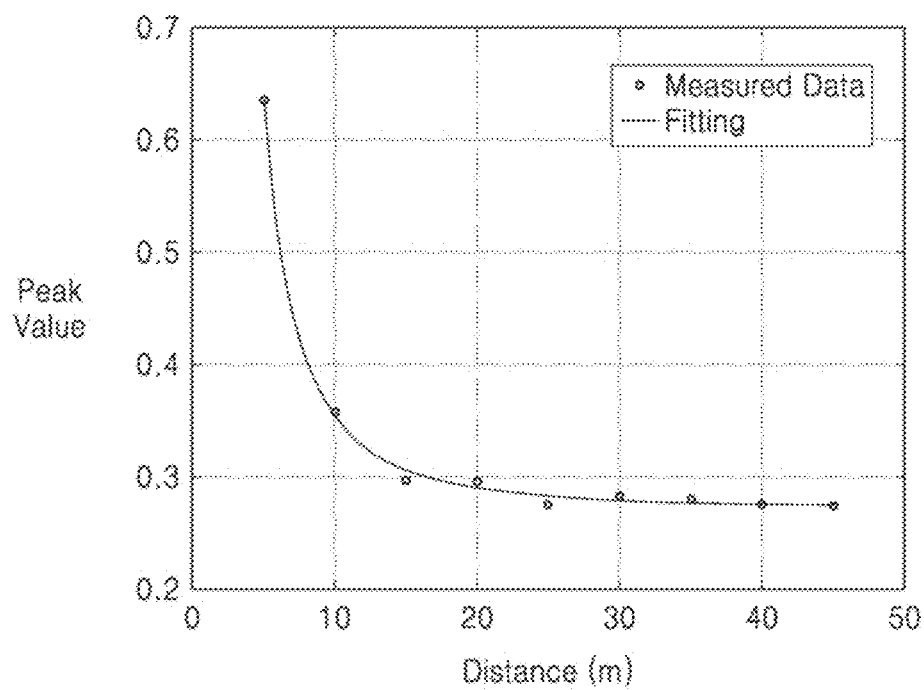
FIG. 10 is a graph showing a relationship between a distance to a reference object and a peak value according to an embodiment.

FIG. 10 is a graph showing a relationship between a distance to a reference object and a peak value according to an embodiment. The coordinate values of the baseline were acquired by changing the reference object at 5 m intervals. It can be seen that the peak value when the reception signal is the maximum decreases as the distance of the reference object increases. In particular, the peak value is inversely proportional to the square of the distance of the reference object.

Figure 11:
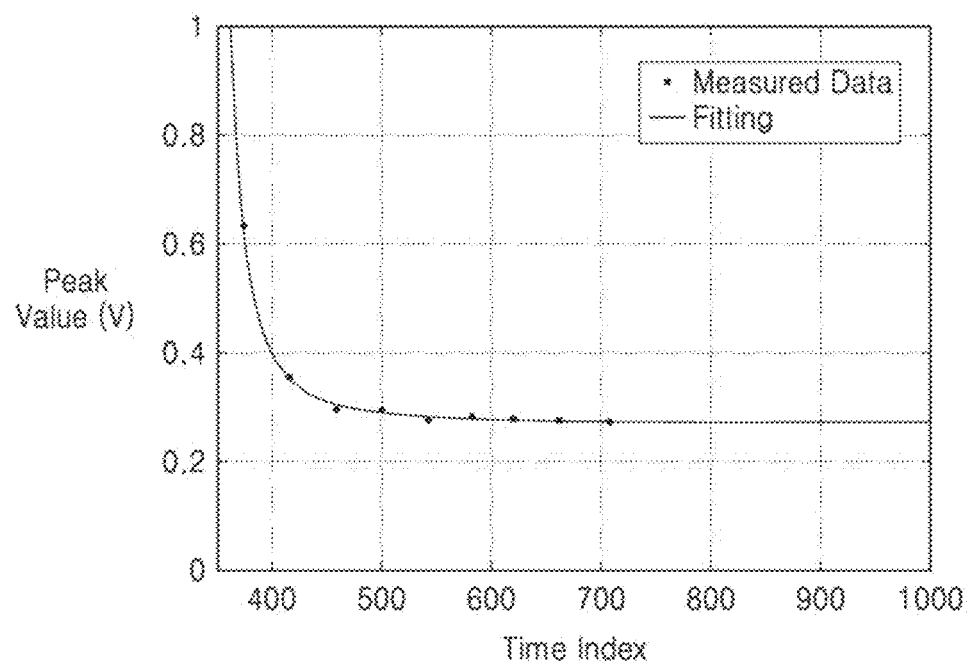
FIG. 11 is a graph showing a relationship between a time index and a peak value according to an embodiment.

FIG. 11 is a graph showing a relationship between a time index and a peak value according to an embodiment. It can be seen that the peak value when the reception signal is the maximum decreases as the corresponding time index value increases. In particular, it can be seen that the peak value is inversely proportional to the square of the time index value. The distance measuring device 100 corrects the reception signal outputted to the receiver 120, and thus the correction unit 132 may use a baseline indicating the relationship between the time index and the peak value shown in FIG. 11.

In order to check the effectiveness of the baseline, the distance measuring device 100 is designed so that a part of the sensing signal emitted from the transmitter 110 is directly incident on the receiver 120 by internal reflection. In addition, sources reflecting sensing signals other than the target object 10 are placed in the surrounding environment. The transmitter 110 emits an infrared laser pulse with a length of 30 nanoseconds (ns), and an avalanche photodiode (APD) is used as a light detector. The ADC connected to the light detector collected data at a sampling rate of 1.25 gigahertz (GHz). A white board was used as the target object 10, and the distance between the distance measuring device 100 and the target object 10 was about 5 m to about 50 m.

Figure 12:
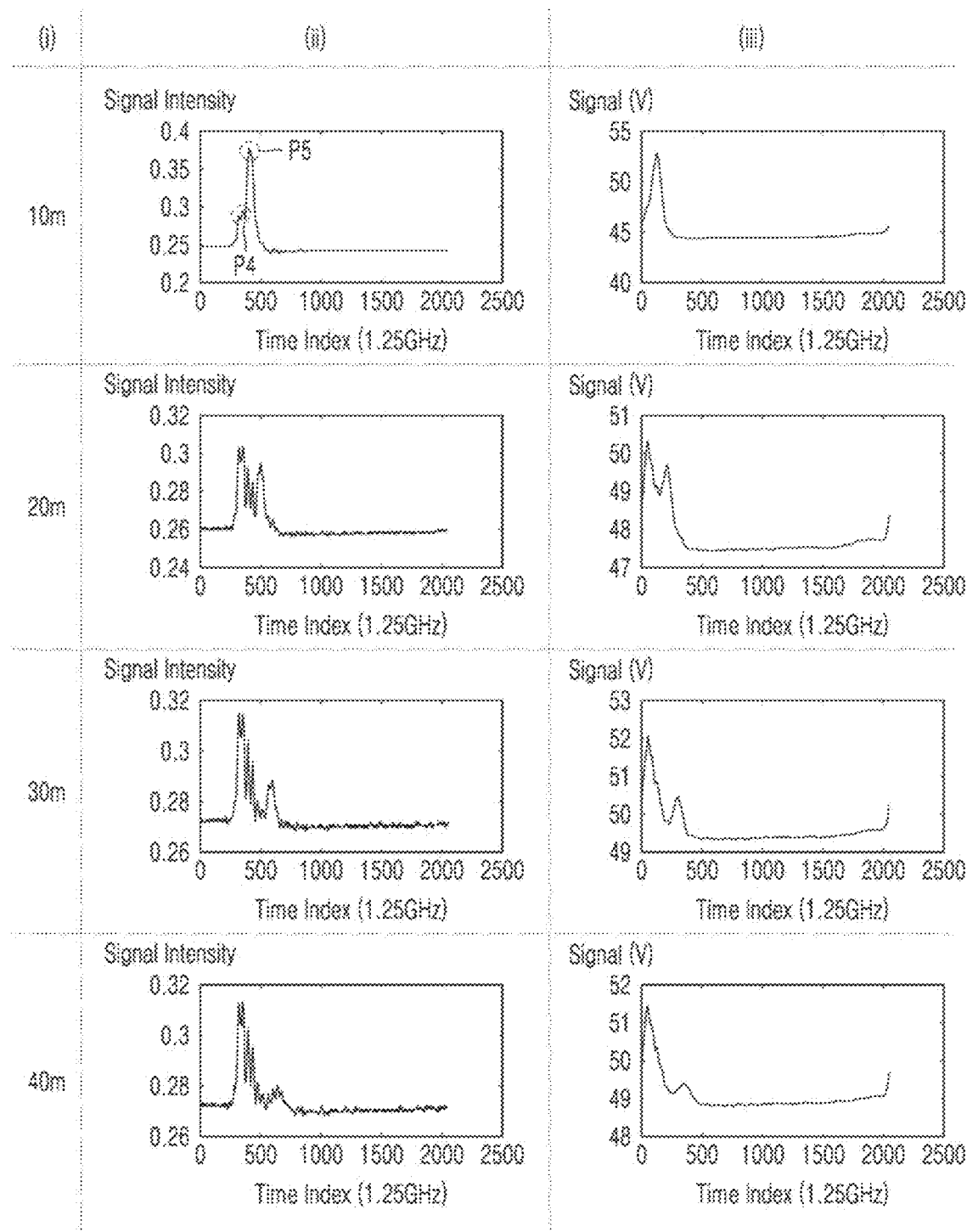
FIG. 12 shows a result of measuring a distance using an uncorrected reception signal.

FIG. 12 shows a result of measuring a distance using an uncorrected reception signal. In FIG. 12, column (i) shows the distance to the target object 10, column (ii) shows the reception signal according to the time index, and column (iii) shows the cross-correlation signal between the reception signal and the transmission signal.

As illustrated in FIG. 12, when the target object 10 is at a distance of about 10 m, it can be seen that a peak with a large intensity is detected. It can be seen that internal reflection or a sensing signal reflected by a surrounding object other than the target object 10 is also detected. However, it can be seen that the peak P5 of the target object 10 is larger than the peak P4 of the surrounding object. Thus, it can be seen that the peak due to the cross-correlation is the peak P5 corresponding to the target object 10.

On the other hand, when the target object 10 is at a distance of about 20 m or more, as the target object 10 is further away from the distance measuring device 100, while the peak P5 corresponding to the target object 10 becomes smaller and smaller, the peak P4 due to the surrounding sources is almost constant. Thus, it can be seen that the peak P4 due to the surrounding sources is measured to be larger than the peak P5 corresponding to the target object 10, and the peak due to the cross-correlation is due to the surrounding objects, not the target object 10. This means that the distance measurement with respect to the target object 10 becomes impossible.

This means that even if the receiver 120 detects the reflected light for the target object 10 at a distance of up to 40 m, it is difficult to measure the target distance of the target object 10 in the signal processing process.

Figure 13:
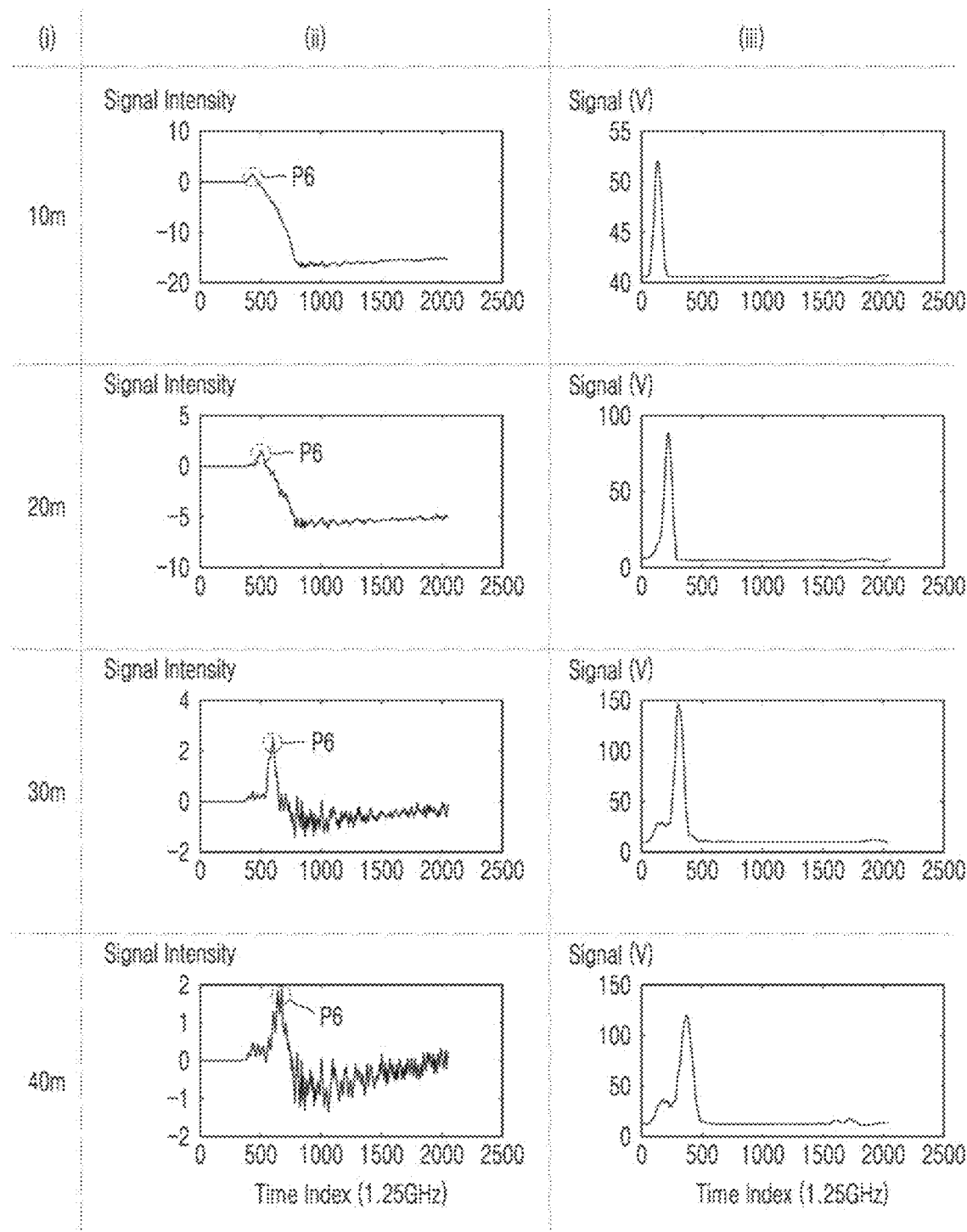
FIG. 13 is a result of measuring a distance using a reception signal corrected as a baseline.

FIG. 13 is a result of measuring a distance using a reception signal corrected as a baseline. In FIG. 13, column (i) shows the distance of the target object 10, column (ii) shows the corrected reception signal according to the time index, and column (iii) shows the result of the correlation between the corrected reception signal and the transmission signal.

As shown in column (ii) of FIG. 13, in the corrected reception signal, regardless of the distance to the target object 10, it can be seen that a peak corresponding to an internal reflection or a sensing signal reflected by a surrounding object other than the target object 10 hardly appears, and one peak P6 corresponding to the target object 10 clearly appears.

And, as shown in column (iii) of FIG. 13, as a result of the correlation between the corrected reception signal and the transmission signal, it can be seen that one peak appears more clearly. In addition, it can be seen that each of the peaks has a different time index value and indicates a distance to the target object 10. That is, by using the corrected reception signal, the target object 10 located at a distance of 10 m or more can be identified, and distance information on the target object 10 can be accurately measured.

Figure 14:
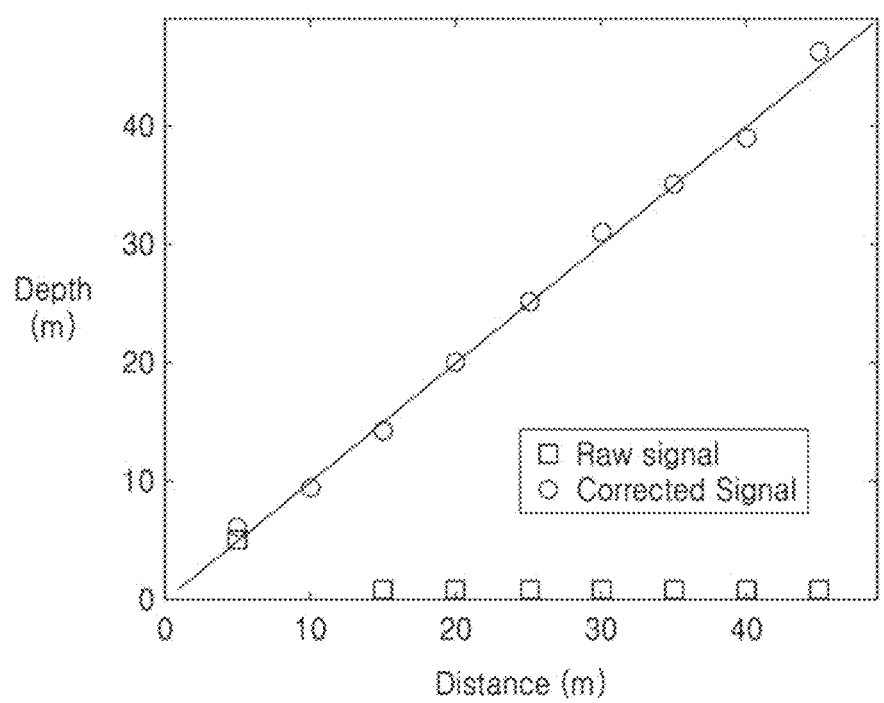
FIG. 14 is a graph showing an existing distance measurement result and a distance measurement result according to an embodiment.

FIG. 14 is a graph showing an existing distance measurement result and a distance measurement result according to an embodiment. According to the results of distance measurement without using the baseline, when the distance to the target object 10 is within about 10 m, the distance can be measured normally. However, when the distance to the target object 10 exceeds about 10 m, it can be confirmed that it is difficult to measure the distance.

However, according to the distance measurement result using the baseline according to an embodiment, it can be confirmed that not only the target object 10 within about 10 m but also the target object 10 at a distance exceeding about 10 m are accurately measured. The distance measuring device 100 according to an embodiment may also measure target object 10 at a distance of about 50 m.

Meanwhile, the above-described operating method of the distance measuring device 100 may be recorded in a computer-readable recording medium in which one or more programs including instructions for executing the method are recorded. Examples of computer-readable recording media include hardware devices specially configured to store and execute program instructions, for example, magnetic media such as hard disks, floppy disks and magnetic tapes, optical media such as CD-ROM and DVD, magneto-optical media such as a floptical disk, and ROM, RAM, flash memory, etc. Examples of the program instructions include not only machine language codes such as those produced by a compiler, but also high-level language codes that can be executed by a computer using an interpreter or the like.

Since the reception signal is corrected using the baseline, noise signals can be removed.

It is possible to easily obtain information on objects in a distant distance.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A distance measuring device comprising:
   a transmitter configured to emit a sensing signal toward a target object based on a transmission signal;
   a receiver configured to detect the sensing signal and output a reception signal corresponding to the sensing signal; and
   a processor configured to correct the reception signal by dividing the reception signal by a peak value of a baseline after matching a time index of the reception signal and a time index of the baseline, and determine a distance to the target object based on a cross-correlation signal indicating a cross-correlation between the corrected reception signal and the transmission signal,
   wherein the baseline represents a result of receiving the sensing signal reflected from a reference object positioned at a plurality of different distances.

2. The distance measuring device of claim 1, wherein the receiver is further configured to output, as the reception signal, a first reception signal corresponding to the sensing signal reflected from the target object and a second reception signal corresponding to the sensing signal reflected by a surrounding object that is different from the target object.

3. The distance measuring device of claim 2, wherein the processor is further configured to correct the first reception signal and the second reception signal based on the baseline so that a size of the corrected first reception signal is greater than a size of the corrected second reception signal.

4. The distance measuring device of claim 1, wherein the peak value of the baseline is greater than or equal to a size of the reception signal at a point where the time index of the baseline matches the time index of the reception signal.

5. The distance measuring device of claim 1, wherein the peak value of the baseline is inversely proportional to a value of the time index.

6. The distance measuring device of claim 1, wherein the baseline is based on a result of receiving the sensing signal reflected from the reference object having a reflectance of 90% or more while changing a distance of the reference object.

7. The distance measuring device of claim 1, wherein the distance measuring device is configured to measure the distance to the target object when the target object is 10 meter or more away from the distance measuring device.

8. The distance measuring device of claim 1, wherein the processor is further configured to determine the distance between the distance measuring device and the target object by using a time that is taken until the cross-correlation signal becomes greater than or equal to a reference value.

9. The distance measuring device of claim 8, wherein the reference value is a maximum value of the cross-correlation signal.

10. The distance measuring device of claim 1, wherein the receiver comprises a converter configured to convert the reception signal into a digital signal.

11. The distance measuring device of claim 1, wherein the transmitter is configured to modulate the sensing signal by at least one of phase modulation and frequency modulation and emit the modulated sensing signal.

12. A distance measuring method comprising:
   emitting a sensing signal to a target object, as a transmission signal;
   detecting the sensing signal and outputting a reception signal corresponding to the sensing signal;

correcting the reception signal by dividing the reception signal by a peak value of a baseline after matching a time index of the reception signal and a time index of the baseline; and determining a distance to the target object based on a cross-correlation between the corrected reception signal and the transmission signal, wherein the baseline represents a result of receiving the sensing signal reflected from a reference object positioned at a plurality of different distances.

13. The method of claim 12, wherein the outputting of the reception signal comprises outputting, as the reception signal, a first reception signal corresponding to the sensing signal reflected from the target object and a second reception signal corresponding to the sensing signal reflected by a surrounding object that is different from the target object.

14. The method of claim 13, wherein the correcting of the reception signal comprises correcting the first reception signal and the second reception signal based on the baseline so that a size of the corrected first reception signal is greater than a size of the corrected second reception signal.

15. The method of claim 12, wherein the peak value of the baseline is greater than or equal to a size of the reception signal at a point where the time index of the baseline matches the time index of the reception signal.

16. The method of claim 12, wherein the peak value of the baseline is inversely proportional to the time index.

17. The method of claim 12, wherein the baseline is based on a result of receiving the sensing signal reflected from the reference object having a reflectance of 90% or more while changing a distance of the reference object.

18. A distance measuring device comprising:

a transmitter configured to emit a first part of a transmission signal to a target object, as a sensing signal;

a receiver configured to detect the sensing signal that is reflected from the target object and output a reception signal corresponding to the detect sensing signal;

a memory configured to store baseline data that indicates a relation between a peak value of a reference signal that is reflected from a reference object, and a time index representing a time of flight (ToF) of the reference signal, and a processor configured to retrieve the baseline data from the memory, correct the reception signal by dividing the reception signal by the peak value of the baseline data after matching a time index of the reception signal and the time index of the baseline data, and determine a distance to the target object based on a cross-correlation between the corrected reception signal and a second part of the transmission signal, wherein the baseline represents a result of receiving the sensing signal reflected from the reference object positioned at a plurality of different distances.

* * * * *